April 21, 1925.  G. MOURLAM ET AL  1,534,186
CHAIN GRATE STOKER
Filed July 30, 1920   2 Sheets-Sheet 1
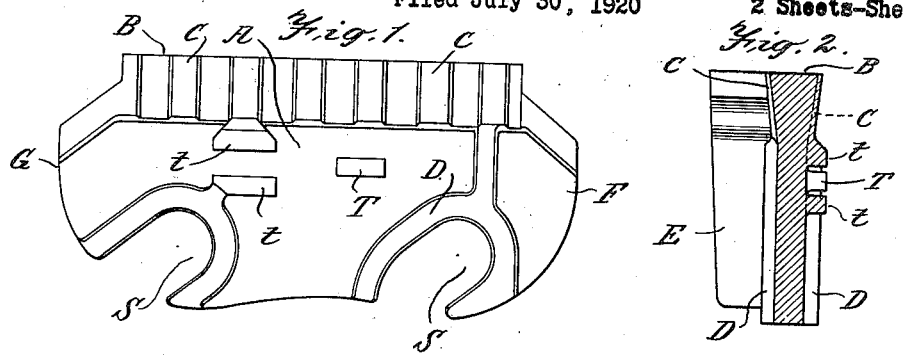
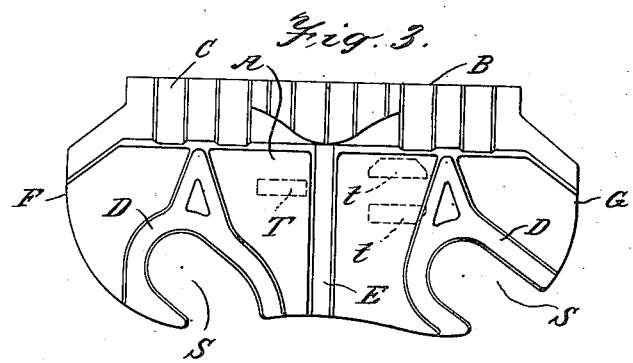
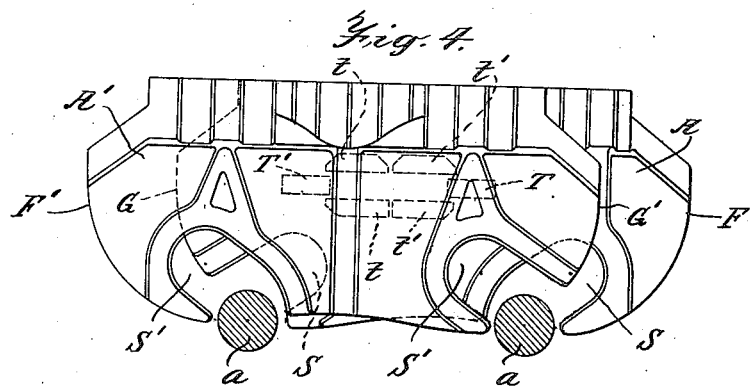
INVENTORS
Georges Mourlam
BY Marcel Sutter
Gifford & Bull
their ATTORNEYS

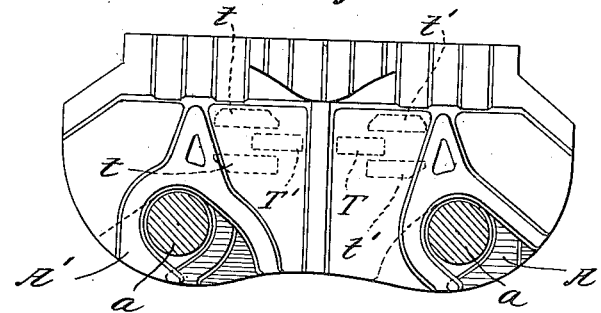
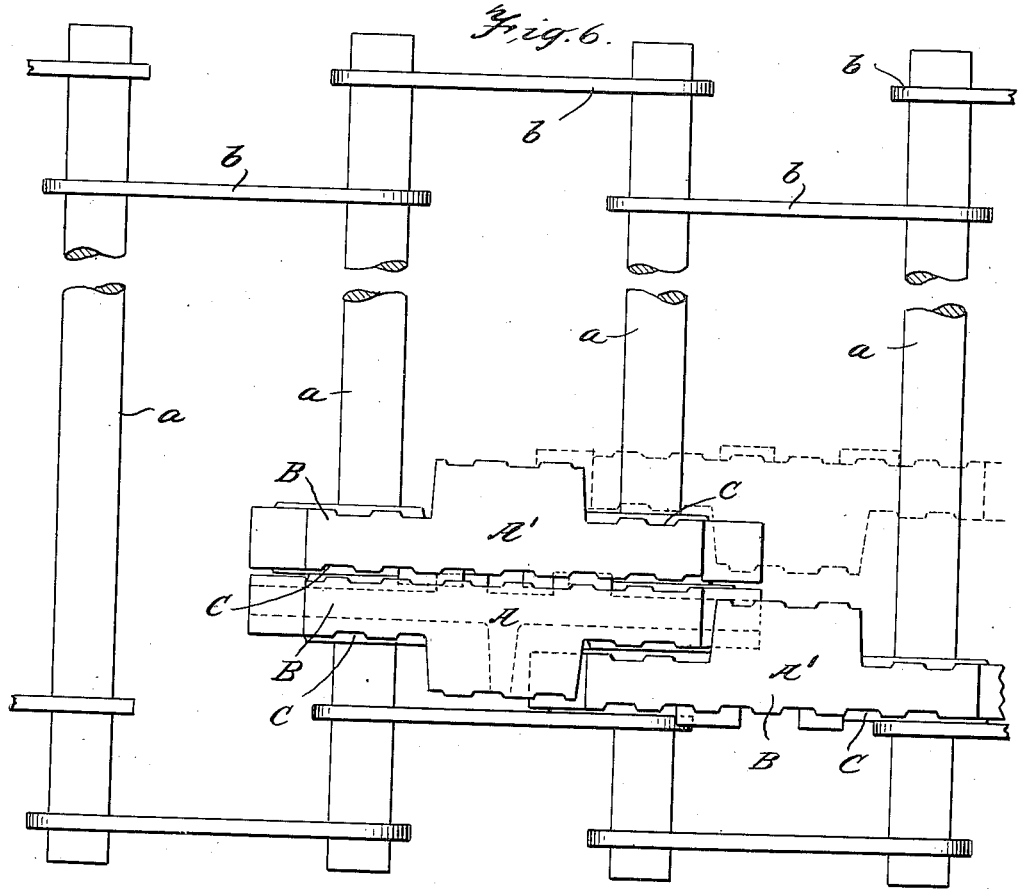

Patented Apr. 21, 1925.

1,534,186

UNITED STATES PATENT OFFICE.

GEORGES MOURLAM AND MARCEL SUTTER, OF PARIS, FRANCE, ASSIGNORS TO THE BABCOCK & WILCOX COMPANY, OF NEW YORK, N. Y.

CHAIN-GRATE STOKER.

Application filed July 30, 1920. Serial No. 399,987.

*To all whom it may concern:*

Be it known that we, GEORGES MOURLAM and MARCEL SUTTER, both citizens of the French Republic, and residing at Paris, France, have invented a certain new and useful Improvement in Chain-Grate Stokers, of which the following is a specification.

Our invention relates to chain grate stokers of the usual type, in which a plurality of links are connected in longitudinal alinement by means of connecting rods or pins to form an endless chain belt or grate, which passes over suitable sprockets, or other curved members, so that the belt has a horizontal upper and a horizontal lower run. In such grates, it is usual to arrange the links so that each link is connected with a pair of rods, but so that the successive links in any given row longitudinally of the chain are not connected to the same rods.

Heretofore it has been necessary, when it is desired to remove and replace a link from a chain grate, either to entirely disassemble the chain, as by removing nuts or other fastening devices on the ends of the chain rods, or by moving some or all of the links sidewise to disengage them from the locking engagement which holds them in place on the chain.

One of the objects of our invention is to provide a link which can be removed and returned to place in the chain without disturbing the position of any other link in the chain, and yet a link which will be held in place without any locking device which would be liable to destruction when subjected to the heat of the fuel bed.

Our invention will best be understood by reference to the accompanying drawings, in which Figure 1 is a side view of a link member constructed to carry out our invention; Fig. 2 is a section through Fig. 1; Fig. 3 is a side elevation of the link member shown in Fig. 1 as viewed from the opposite side; Fig. 4 is a diagrammatic representation of the two members which form a link, these members being shown in their respective positions which they would occupy when they are ready to be mounted on the connecting rods; Fig. 5 is a view similar to Fig. 4 but with the link in place; and Fig. 6 is a fragmentary plan view of a portion of the chain grate.

Like reference characters indicate like parts throughout the drawings.

In the illustrative form of our invention, we form each link of a pair of cooperating members adapted to be mounted on the same chain rods and to be moved into position in opposite angular directions with respect to the chain surface, so that interlocking pieces on the adjacent sides of the two members will cooperate to interlock as the two members are brought into their operating positions in the grate. In Figs. 1, 2 and 3 we have illustrated a form of link member which, so far as the grate surface is concerned, may be of the usual type. The link member, which is represented generally by A, has an upper surface B, which constitutes the principal part of the fuel-supporting surface, the sides of the upper part of the member being provided, in the illustrative form, with recesses C in the usual manner.

At opposite ends of the lower portion of the link member A are openings S for the chain rods $a$, these openings being in the form of slots with semi-circular ends, the latter being adapted to rest on the rods $a$—$a$ when the link is in position. Ribs D surround the openings S and extend to the lower portion of the grate surface at the upper side of the link member. In the illustrative form, the link member is provided with an extension E in the form of a rib to contact with an adjacent rib to seal the space between adjacent links when air under pressure is supplied between the runs of the grate. This latter rib is no part of our present invention and may be omitted if desired.

It will be noted that the slots or openings S have their axes substantially parallel and at an angle to the top surface of the link, and that the ends F, G of the links are curved in a peculiar manner, the purpose of which will be indicated hereinafter.

A complete link, in the illustrative form, comprises a member A, such as shown in Figs. 1, 2 and 3, and a complementary member like the member A, which may be identical with that link member but turned end-for-end. In Fig. 4 two such members, indicated in full and dot-and-dash lines, respectively, and marked A and A', respectively, are shown placed side by side and about to be lowered into engagement with the rods $a, a$. It will be clear that in order to bring the respective slots into engagement with the rods, each member must be moved in a direction parallel to the axes of the respective slots S and S'. This means that the member A must be moved downward and to the left of Fig. 4, and the member A' must be moved downward and to the right of Fig. 4. This would bring the two parts into the relative positions shown in Fig. 5. It is obvious, however, that when such a link was moving over the lower or return run of the chain, the members would move by gravity in the opposite direction to that just described, and fall away from the rods $a, a$. Such a motion would be prevented, however, so long as the link is running horizontally, by the similar links which are located in the chain at either end of the link members A, A'; that is to say, since, with the angular slots the link must move longitudinally of the chain at the same time that it is moving off the rods $a, a$, such motion is prevented by the remaining links of the chain which are located at the opposite ends of the members A, A', and which would resist this longitudinal motion.

When the link described is traveling around the curved sprockets at the ends of the horizontal runs of the chain, however, the space between the ends of adjacent links longitudinally of the chain is greatly increased, and as a link such as has been described was traveling over the lower portion of the sprocket, one or the other of the members A, A' would be pulled by gravity away from the rods $a, a$ unless there was some means to prevent it. This means we provide, in the illustrative form, by interlocking portions or projections on the sides of the complementary members of the link. On one side of the vertical center line of the link member A there are two lugs $t, t$ spaced apart and on the opposite side of the center line, and positioned horizontally opposite the space between the pair of lugs $t, t$ is a single lug T. These lugs project from the side of the body portion of the link, as shown in Fig. 2, and when the two complementary members are placed side by side so as to bring these lugs in the position shown in Fig. 4, they will all occupy the same vertical plane, the lug T being at the right of the lugs $t', t'$, and the lug T' being at the left of the lugs $t$ $t$. The space between the lugs $t, t$ and the width of the single lug T is such that, as the links are moved from the position shown in Fig. 4 to that shown in Fig. 5, the lug T on the link member A will pass into the space between the lugs $t', t'$ on the member A', and similarly the lug T' will pass between the lugs $t, t$ on the member A.

The presence of these lugs compels the link members A, A' to be moved simultaneously and in opposite directions when passing from the position shown in Fig. 4 to the position shown in Fig. 5, or vice versa, which would not be the case if these lugs were omitted. In other words, in order to withdraw the member A from the rods $a, a$, the member A' must also be withdrawn from the rods at the same time. But the link members A, A' are moved in opposite directions longitudinally of the chain when they are being removed from the rods $a, a$. Consequently as the link member A is passing around the sprocket at a time when it is not held against motion by contact of its ends with the ends of the adjacent links, it cannot fall or move downward by gravity unless the link member A' is being correspondingly and simultaneously moved upward to disengage the interlocking lugs. Obviously, this motion upward of the link member A' is resisted by gravity. The pair of complementary link members A, A' are, therefore, locked in place against the pull of gravity.

On the other hand, a pair of complementary link members A, A' can be removed from the chain when the links to be removed are turning around the sprockets at the ends of the horizontal runs. At such time, the link members A, A' may be drawn outward in their own vertical planes without disturbing any other links in the chain, the link members being moved, however, in opposite angular directions. The ends F, G and F', G' of the link members A, A' are curved, as shown in the drawing, so as to give the necessary freedom of motion at the time the link is on the curved part of the run, the shape of the end of each link member being such that it can be moved in the direction necessitated by the angular slots S, S or S', S' without interfering with the end of the next adjacent link member. Any pair of link members A, A' forming a link, therefore, can be removed from the chain when such link is on the curved part of the run, and a new link substituted therefor, without disturbing any other links in the chain, and, indeed, while the grate is in motion, and yet the links are held securely in place without the use of any devices which are liable to deterioration through the heat of the fuel bed.

In Fig. 6 are shown coupling or driving links b in position on the transverse grate rods a.

It will be apparent that in accordance with our invention, the grate links are placed in position in the chain and removed therefrom in the planes of the link members while the remaining links of the chain remain in their respective operative positions.

We claim:

1. A link for an endless chain grate in which a plurality of links are connected by means of transverse connecting rods, comprising two complementary members each of which is provided with substantially parallel slots angularly arranged with respect to the top of the link and oppositely inclined with respect to the slots of the complementary member, and interlocking means between the two members operable on the movement of the two members into position on the said rods.

2. A compound link for a chain grate in which a plurality of links are connected by means of connecting rods, comprising a pair of members each having slots adapted to engage the rods of the chain and interlocking portions between the said members adapted to prevent the withdrawal of the link from the chain by gravity and to permit the withdrawal of the link by a movement of the members thereof in the vertical plane of the link and while the remaining links of the chain are in their respective operative positions.

3. In an endless chain grate in which a plurality of links are connected by means of connecting rods, a link comprising two side-by-side link members provided with open-end inclined slots adapted to engage the same chain rods and provided with interlocking means adapted to be moved into and out of engagement when the two members are moved in their vertical planes and in opposite angular directions.

4. A compound link having two link members side by side, each member having slots adapted to engage the chain rods and angularly arranged with respect to the top of the respective link members, the slots of the two members being oppositely inclined with respect to each other, said members being provided with interengaging means to prevent the removal of either member from the rods without movement of the other member and to permit removal thereof in their vertical planes when moved in reverse directions, respectively.

5. A compound link having two link members side-by-side, each having open-end slots with a slot in the one member making an angle with the slots of the other member which engages the same chain rod, said members being provided with interengaging means to prevent the removal of either member from the chain rods without movement of the other member to permit removal thereof in their vertical planes when moved in reverse directions respectively.

6. A compound link member for a chain grate comprising two side by side link members provided with open end slots adapted to engage the same chain rods and angularly arranged with respect to the top of the respective link members and inclined with respect to each other, said members being provided on their facing sides with projecting lugs adapted to interengage when in position on the chain rods.

7. A compound link for a chain grate in which a plurality of links are connected by means of connecting rods, comprising a pair of link members each having open-end slots making an angle with the top of the respective link members and adapted to engage a pair of chain rods with the slots of one member extending at an angle to the slots in the other member, and interlocking portions between the said members constructed and arranged to prevent the movement of one of the pair of members in its vertical plane unless the other member is also moved in its vertical plane, and to permit simultaneous vertical movement of said link members in their own planes.

8. A compound link for a chain grate in which a plurality of links are connected by means of connecting rods, comprising two independent side-by-side sections each provided on its lower side with open-end slots oppositely inclined from those of the companion section and adapted to engage spaced chain rods, said sections being provided with members brought into interengagement by movement of the sections into position in the chain in the vertical planes of the sections for locking said sections in position.

9. A compound link for a chain grate in which a plurality of links are connected in longitudinal alinement by means of connecting rods and comprising a pair of members each having slots oppositely inclined to those of the other member and adapted to engage the rods of the chain, said members being provided with laterally extending interlocking lugs to prevent withdrawal of the link from the chain by gravity and to permit withdrawal of the link by movement of the members thereof in opposite angular directions with respect to the chain face and in the vertical planes of the members and while the remaining links of the chain are in their respective operating positions.

10. A compound link for a chain grate in which a plurality of links are connected by means of connecting rods comprising two independent side by side members each formed on its lower side with open end slots inclined with reference to the top of the respective link members, the slots of one member being inclined oppositely from those of the other, and the slots of the two members engaging the same grate rods, and means for interlocking the two members, and adapted to prevent withdrawal of the link members by gravity at any point in the travel of the chain and to permit the withdrawal of the link members from the chain while the remaining links of the chain are in their respective operative positions.

In testimony whereof we have signed our names to this specification in the presence of a subscribing witness.

GEORGES MOURLAM.
MARCEL SUTTER.

Witness:
CLEMENT S. EDWARDS.